US006809878B2

United States Patent
Abe (10) Patent No.: US 6,809,878 B2
(45) Date of Patent: Oct. 26, 2004

(54) ZOOM LENS (75) Inventor: Yasuhiko Abe, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 10/379,427

(22) Filed: Mar. 4, 2003

(65) Prior Publication Data
US 2003/0223123 A1 Dec. 4, 2003

(30) Foreign Application Priority Data
Mar. 4, 2002 (JP) .......................................... 2002-056866

(51) Int. Cl.[7] .............................................. G02B 15/14
(52) U.S. Cl. ........................ 359/680; 359/689; 359/784; 359/786; 359/787
(58) Field of Search .............................. 359/691, 687, 359/686, 685, 676, 763, 765, 769, 770, 771, 774, 783, 784, 789, 790

(56) References Cited

U.S. PATENT DOCUMENTS

| 5,285,317 | A | * | 2/1994 | Uzawa ........................ 359/676 |
| 5,434,710 | A | | 7/1995 | Zozawa | |
| 6,308,011 | B1 | | 10/2001 | Wachi et al. | |
| 6,349,002 | B1 | * | 2/2002 | Shibayama et al. ......... 359/689 |
| 6,621,555 | B1 | * | 9/2003 | Terasawa et al. ............. 355/53 |
| 2002/0097497 | A1 | * | 7/2002 | Kamo ........................ 359/629 |

FOREIGN PATENT DOCUMENTS

| JP | 5-173073 | 7/1993 | .......... G02B/15/20 |
| JP | 6-201993 | 7/1994 | .......... G02B/15/00 |
| JP | 11-287953 | 10/1999 | .......... G02B/15/16 |
| JP | 2000-89110 | 3/2000 | .......... G02B/15/16 |
| JP | 2000-111798 | 4/2000 | .......... G02B/15/20 |

* cited by examiner

Primary Examiner—Timothy Thompson
(74) Attorney, Agent, or Firm—Darby & Darby (57) ABSTRACT The present invention provides a compact, thin zoom lens. The zoom lens according to the present invention includes, from an object side to an image plane side, a first lens group having an overall negative overall refractive power, a second lens group having an overall positive refractive power; and a third lens group having an overall positive refractive power. The first lens group includes a first lens and a second lens bonded together and having a negative refractive power. The second lens group includes a third lens with a positive refractive power, and a fourth lens and a fifth lens bonded together and having a negative refractive power. The third lens group includes a sixth lens having a positive refractive power. As a result, the total length is reduced, the retracted length can be reduced, and the zoom lens can be compact and thin.

9 Claims, 8 Drawing Sheets

FIG. 1

FIG. 3a Spherical Aberration Sine Condition (SC)

FIG. 3b Astigmatism

FIG. 3c Distortion

FIG. 3d Lateral Chromatic Aberration

ZOOM LENS

CROSS-REFERENCE TO RELATED APPLICATION

This application claims priority of Japanese Patent Application Number 2002-056866, filed Mar. 4, 2002, which is hereby incorporated by reference in its entirety.

FIELD OF THE INVENTION

The present invention relates to a zoom lens used in digital still cameras, video cameras, and other devices equipped with an imaging element such as a CCD. More specifically, the present invention relates to a compact zoom lens suited for digital still cameras, video cameras, and other devices equipped with an imaging element having a high pixel count.

BACKGROUND OF THE INVENTION

Japanese Laid-Open Patent Publication Number Hei 5-173073 and Japanese Laid-Open Patent Publication Number 6-201993 disclose examples of conventional zoom lenses that include a first lens group having a negative refractive power; a second lens group having a positive refractive power; and a third lens group having a positive refractive power. The three lens groups are formed from at least seven lenses arranged along an optical axis.

In recent years, there has been significant progress in the technology of solid-state imaging elements such as CCD's that are used in devices such as video cameras. The increase in the density and number of pixels in these devices has led to a growing need for lenses for optical systems with superior optical characteristics. However, as devices such as digital still cameras and video cameras decrease in size, the zoom lenses mounted on these devices must become more compact, thinner, and lighter. Compactness and thinness, especially in terms of the total length of the lens, is particularly important when the zoom lens is mounted on the main camera unit regardless of whether the camera is in use.

A conventional zoom lens uses at least seven lenses, and therefore, the zoom lens has a significant length along its optical axis. As a result, conventional zoom lenses do not meet the demands for a more compact and thinner digital still camera, video camera, and the like.

OBJECTS AND SUMMARY OF THE INVENTION

The present invention provides a zoom lens having a compact, light, and thin design with superior optical characteristics that efficiently correct various aberrations. The zoom lens is used particularly for imaging elements with high pixel counts that meet the following conditions: a zoom magnification of approximately 2×; a total lens length at imaging of no more than 34 mm; a total thickness along the optical axis of each lens group of no more than 12 mm; a back focus of no more than 3 mm for placement of a low-pass filter or the like; an exit pupil position of at least 120 mm to prevent eclipsing; a lens brightness (F number) at the wide-angle end of the zoom lens of approximately 2.8; distortion (TV distortion) of no more than |1.5%|; and a thin design when stored. The wide-angle end and the telephoto end are imaging positions of the zoom lens.

The zoom lens according to the present invention includes, from the object side to the image plane side: a first lens group having a negative overall refractive power; a second lens group having a positive overall refractive power; and a third lens group having a positive overall refractive power. The first lens group has a first lens and a second lens bonded together and having a negative refractive power. The second lens group has a third lens with a positive refractive power and a fourth lens and a fifth lens. The fourth and fifth lenses are bonded together and have a negative refractive power. The third lens group has a sixth lens having a positive refractive power.

Since the zoom lens of the present invention has a total of six lenses and four lens components, sensitivity to optical axis offsets (eccentricities) between individual lens groups is reduced. Also, the total length and total retracted length are reduced, and the resulting zoom lens is compact and thin.

The first lens is a bi-convex lens positioned toward the object side of the zoom lens and having a positive refractive power. The second lens is a bi-concave lens positioned toward the image plane side of the zoom lens and having a negative refractive power. The zoom lens satisfies the following:

$$v2-v1>20 \qquad (1)$$

where v1 is the Abbe number of the first lens and v2 is the Abbe number of the second lens. A zoom lens having this structure can effectively correct chromatic aberration over the entire spectrum, can provide good optical properties, and can have a compact design.

Additionally, the third lens can be a bi-convex lens with both surfaces formed as aspherical surfaces. A zoom lens having this structure can provide a lens brightness (F Number) at the wide-angle end of approximately 2.8 and can effectively correct various types of aberration including spherical aberration.

Additionally, the third lens can satisfy the following:

$$R5>|R6| \qquad (2)$$

where R5 is the curvature radius on the object side of the third lens and R6 is the curvature radius on the image plane side of the third lens. A zoom lens having this structure can further correct various types of aberration.

Additionally, the fourth lens can be a bi-convex lens positioned on the object side of the zoom lens and having a positive refractive power. The fifth lens can be a bi-concave lens positioned on the image plane side of the zoom lens and having a negative refractive power. A zoom lens having this structure can effectively correct spherical aberration and coma. Also, the second lens group can be formed with two lens components so that the space taken up by the lenses is shorter.

Additionally, the sixth lens is a bi-convex lens with both sides formed as aspherical surfaces. A zoom lens having this structure can prevent increased aberration by reducing the total lens length. More specifically, a zoom lens having this structure can effectively correct coma at the telephoto end.

Additionally, the zoom lens can satisfy the following:

$$0.4<f2/|f1|<0.8 \qquad (3)$$

$$1.5<f3/fw<2.1 \qquad (4)$$

where fi is the focal length of i-th lens group (i=1–3) and fw is the focal length of the total lens system at the wide-angle end. A zoom lens having this structure can be compact, can provide a zoom factor of approximately 2× and good optical properties, and can have an exit pupil position that can be set appropriately.

Additionally, the first lens group, the second lens group, and the third lens group can each move along an optical axis during a zoom operation from the wide-angle end to the telephoto end. A zoom lens having this structure can effectively correct various types of aberration, especially astigmatism, at intermediate focal lengths between the wide-angle end and the telephoto end.

Additionally, the third lens group can move first toward the object side of the zoom lens along the optical axis and then toward the image plane side of the zoom lens during a zoom operation from the wide-angle end to the telephoto end. A zoom lens having this structure can further correct astigmatism at intermediate focal lengths between the wide-angle end and the telephoto end.

The above, and other objects, features and advantages of the present invention will become apparent from the following description read in conjunction with the accompanying drawings, in which like reference numerals designate the same elements.

LIST OF DESIGNATORS

I: first lens group
II: second lens group
III: third lens group
1: first lens (bi-convex lens)
2: second lens (bi-concave lens)
3: third lens (bi-convex lens)
4: fourth lens (bi-convex lens)
5: fifth lens (bi-concave lens)
6: sixth lens (bi-convex lens)
7: glass filter
8: aperture stop
D1–D12: distances between surfaces along the optical axis
R1–R13: curvature radius
S–S13: surface
S5, S6, S10, S11: aspherical surface
X: optical axis

DETAILED DESCRIPTION OF THE PREFERRED EMBODIMENTS

Figure 1:
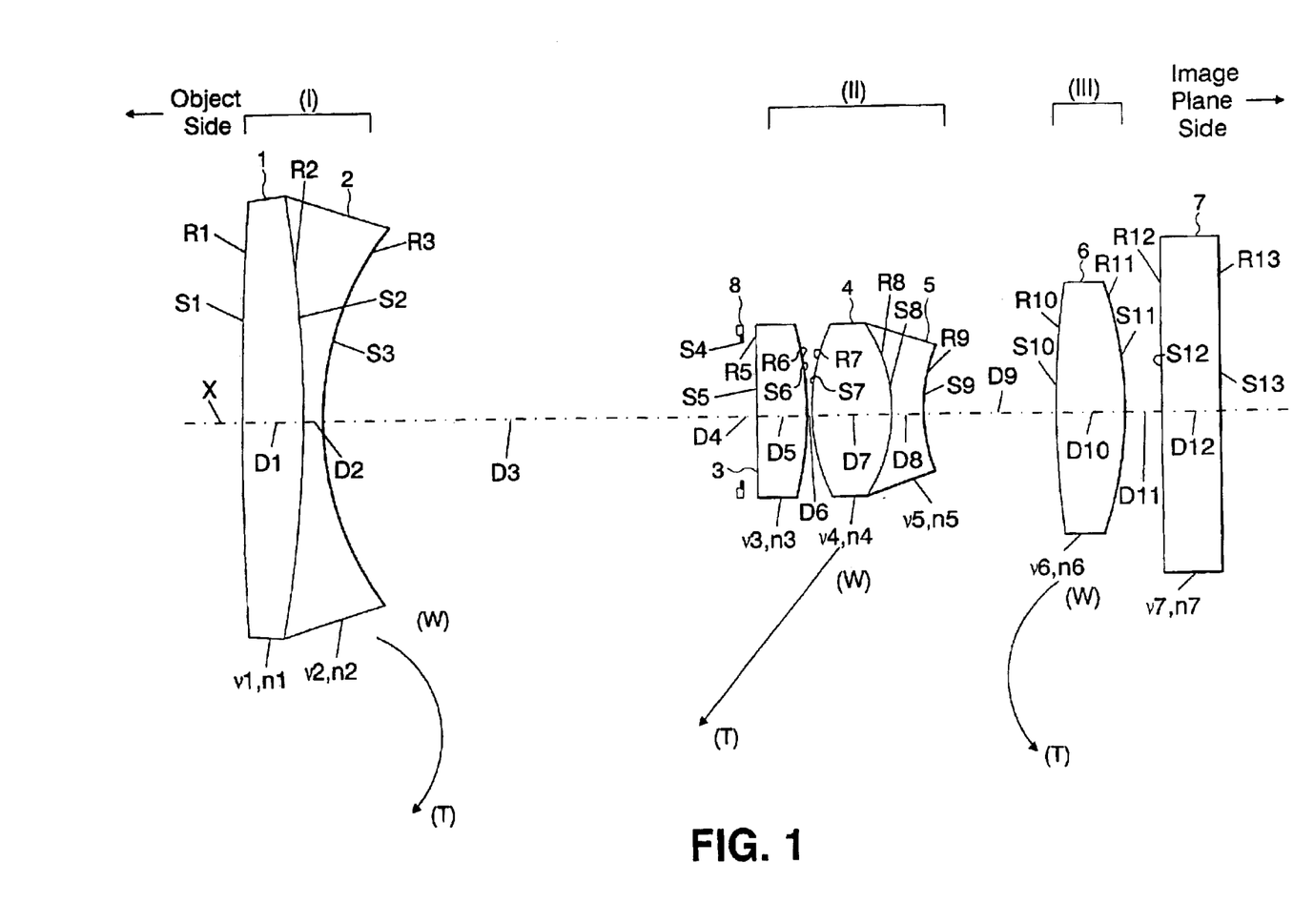
FIG. 1 shows the structure of a zoom lens according to an embodiment of the present invention.
Figure 2A:
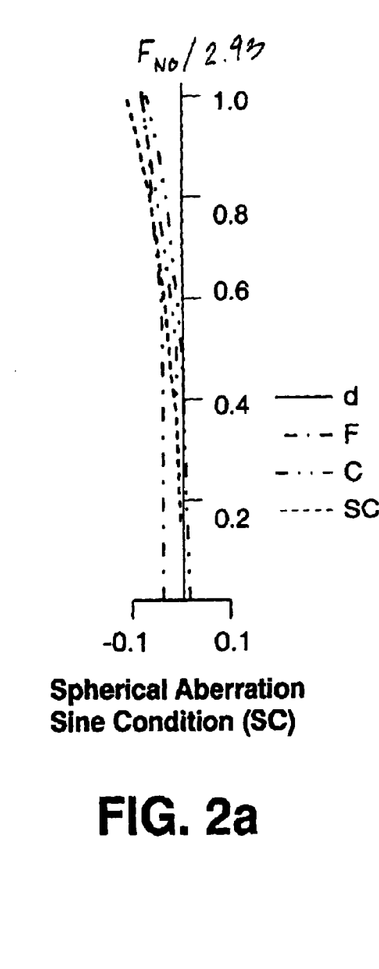
FIG. 2a shows spherical aberration sine condition of the zoom lens of FIG. 1 at a wide-angle end.
Figure 2B:
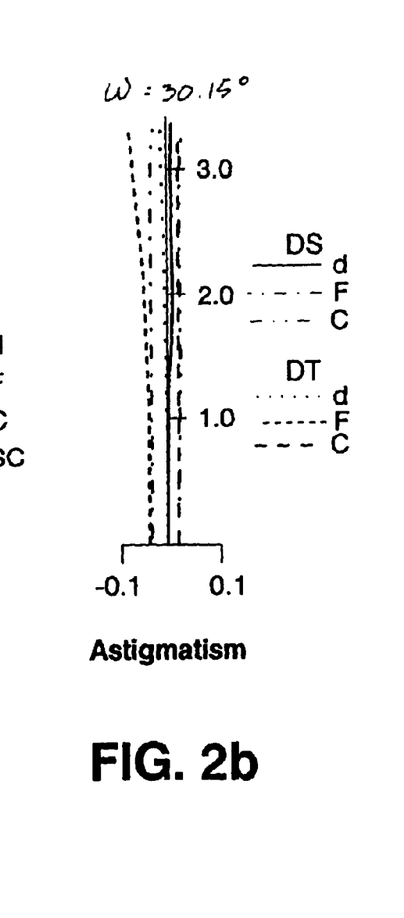
FIG. 2b shows astigmatism of the zoom lens of FIG. 1 at a wide-angle end.
Figure 2C:
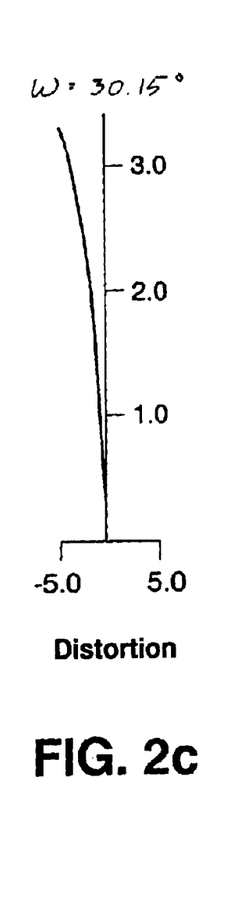
FIG. 2c shows distortion of the zoom lens of FIG. 1 at a wide-angle end.
Figure 2D:
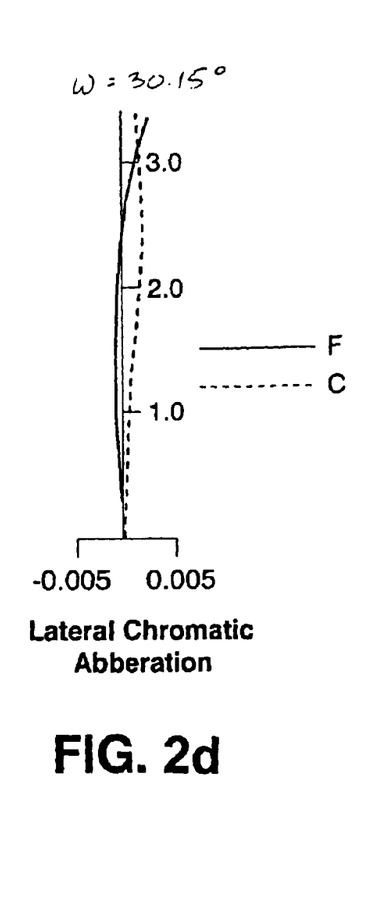
FIG. 2d shows lateral chromatic aberration of the zoom lens of FIG. 1 at a wide-angle end.
Figure 3A:
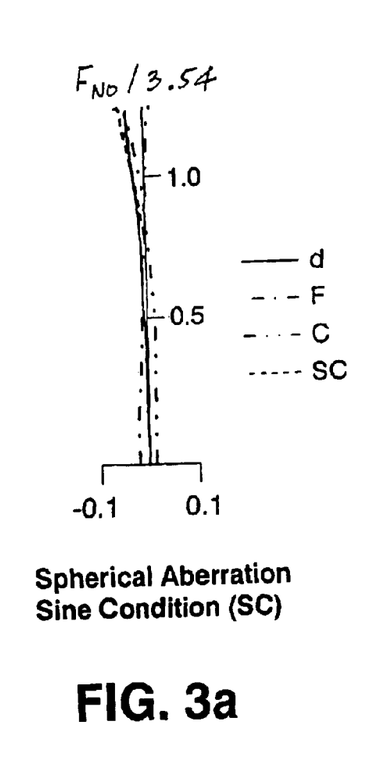
FIG. 3a shows spherical aberration sine condition of the zoom lens of FIG. 1 at a middle position.
Figure 3B:
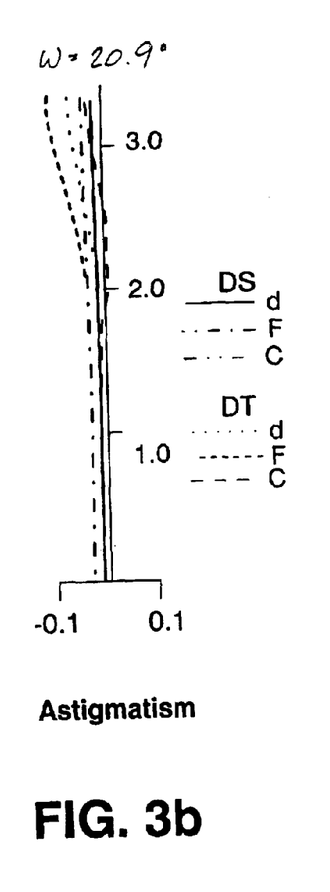
FIG. 3b shows astigmatism of the zoom lens of FIG. 1 at a middle position.
Figure 3C:
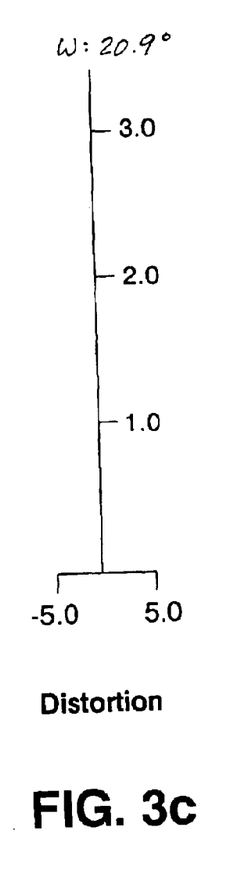
FIG. 3c shows distortion of the zoom lens of FIG. 1 at a middle position.
Figure 3D:
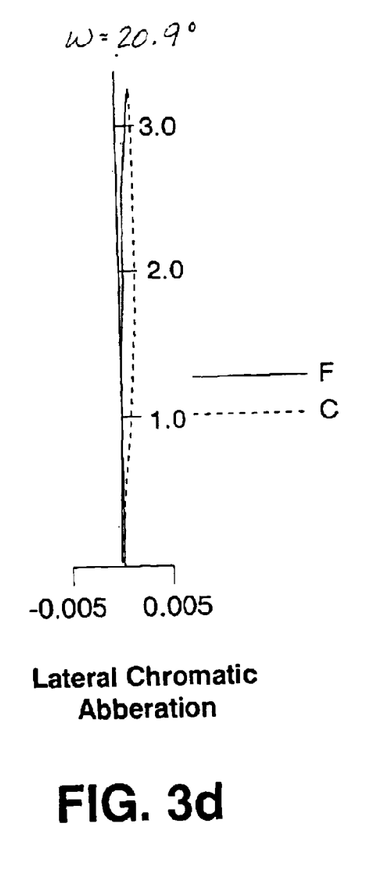
FIG. 3d shows lateral chromatic aberration of the zoom lens of FIG. 1 at a middle position.
Figure 4A:
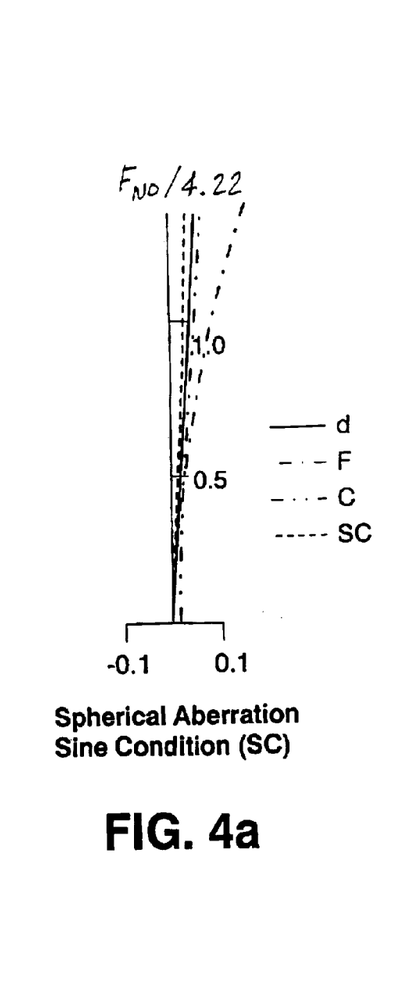
FIG. 4a shows spherical aberration sine condition of the zoom lens of FIG. 1 at a telephoto end.
Figure 4B:
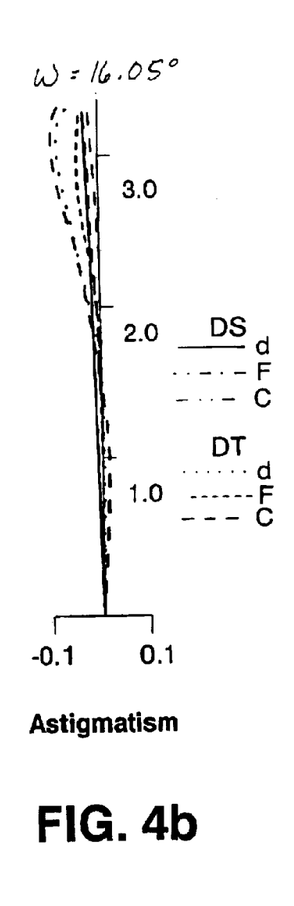
FIG. 4b shows astigmatism of the zoom lens of FIG. 1 at a telephoto end.
Figure 4C:
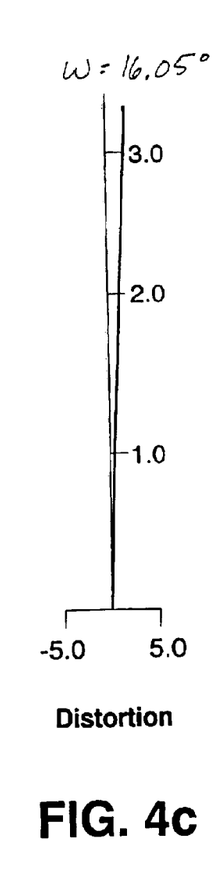
FIG. 4c shows distortion of the zoom lens of FIG. 1 at a telephoto end.
Figure 4D:
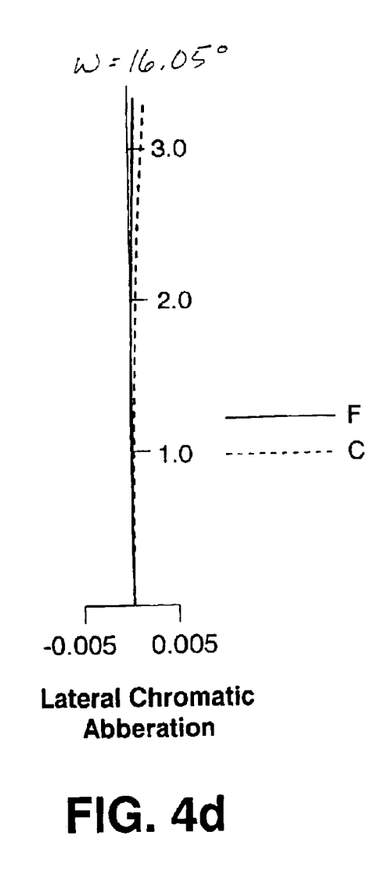
FIG. 4d shows lateral chromatic aberration of the zoom lens of FIG. 1 at a telephoto end.

The embodiments of the present invention will be described with reference to the attached drawings. FIG. 1 shows the basic structure of a zoom lens according to an embodiment of the present invention. The zoom lens as shown in FIG. 1 includes, from the object side to the image plane side of the zoom lens, a first lens group I having a negative overall refractive power, a second lens group II having a positive overall refractive power, and a third lens group III having a positive overall refractive power.

The first lens group I, as shown in FIG. 1, includes a first lens 1 and a second lens 2, which are bonded together, and having a negative refractive power. The first lens 1 is positioned toward the object side of the zoom lens and is a bi-convex lens with a positive refractive power. The second lens 2 is positioned toward the image plane side of the zoom lens and is a bi-concave lens with a negative refractive power.

The second lens group II, as shown in FIG. 1, includes a third lens 3 having a positive refractive power and a fourth lens 4 and a fifth lens 5, which are bonded together and have a negative refractive power. The third lens 3 is a bi-convex lens having aspherical surfaces on the object and the image plane sides of the lens. The fourth lens 4 is positioned toward the object side of the zoom lens and is a bi-convex lens with a positive refractive power. The fifth lens 5 is positioned toward the image side of the zoom lens and is a bi-concave lens with a negative refractive power. The third lens group III, as shown in FIG. 1, includes a sixth lens 6 having a positive refractive power. The sixth lens 6 is a bi-convex lens having aspherical surfaces on the object and the image plane sides of the lens.

A glass filter 7, such as an infrared-cut filter or a low-pass filter, is located on the image plane side of the third lens group III. An aperture stop 8 is located between the first lens group I and the second lens group 11, i.e., between the second lens 2 and the third lens 3.

The first lens group I, the second lens group II, and the third lens group III can move independently along the optical axis X to allow for zooming, from the wide-angle end to the telephoto end, and to adjust the image plane accordingly. As shown by the arrows in FIG. 1, when zooming from a wide-angle end W to a telephoto end T, the first lens group I moves toward the image plane side and then moves toward the object side. The second lens group II moves in a straight line from the image plane side to the object side. The third lens III moves toward the object side and then moves toward the image plane side.

The focal length of the first lens group I is f1; the focal length of the second lens group II is f2; the focal length of the third lens group III is f3; the focal length of the overall lens system at the wide-angle end is fw; the focal length of the overall lens system at the telephoto end is ft, and the focal length of the overall lens system in medium range is fm.

As shown in FIG. 1, the lens surfaces of the first lens 1 through the sixth lens 6 are indicated by Si (i=1–3, 5–11); the curvature radii of lens surfaces Si are indicated by Ri (i=1–3, 5–11); the refractive indices of the i-th lens relative to a line d are indicated by ni (i=1–6); and the Abbe numbers of the i-th lens are indicated by vi (i=1–6).

The glass filter 7 has surfaces Si (i=12, 13), curvature radii Ri (i=12, 13) of the surfaces Si, refractive index n7 relative to the line d, and Abbe number v7. Furthermore, the thickness of the individual lenses and the distances between each of the elements along the optical axis X of the first lens 1 through the glass filter 7 are indicated by Di (i=1–12), as shown in FIG. 1.

The first lens 1 and the second lens 2, which comprise the first lens group I, and the fourth lens 4 and the fifth lens 5, which comprise a part of the second lens group II, are integrally bonded at surfaces S2 and S8, respectively. The two pairs of lenses have identical curvature radii R2 and R8 at surfaces S2 and S8. If these pairs of lenses were replaced by single lenses, chromatic aberration would be difficult to correct and automatic centering would be difficult to achieve due to the exact similarity of the curvature radii of the lens surfaces. By separately preparing and then integrally bonding the first lens 1 and the second lens 2 together (and the fourth lens 4 and the fifth lens 5 together), chromatic aberration, which affects high resolutions, can be easily corrected. Additionally, centering can be performed independently, thereby allowing the lenses to be processed easier.

Furthermore, the first lens group I and the second lens group II are less sensitive to optical X axis offsets (eccentricity) since fewer lens components are used when the first lens 1, the second lens 2, the fourth lens 4, and the fifth lens 5, are bonded in pairs. Additionally, the total lens length and the total retracted length are reduced.

In the second lens group II, surfaces S5, S6 of the third lens 3 can be aspherical having a bi-convex shape. Therefore, the F number at the wide-angle end can be set to 2.8, thereby allowing various types of aberrations such as spherical aberration to be corrected effectively. Without this structure, the F number would have to be set to approximately 3.5 and the number of lenses would have to be increased. However, a zoom lens having this structure effectively corrects various types of aberration.

In the third lens group III, surfaces S10, S11 of the sixth lens 6 can be aspherical having a bi-convex shape. Therefore, increases in various types of aberrations are restricted, the total lens length is reduced, and coma is effectively corrected, particularly at the telephoto end.

The aspherical surfaces on the third lens 3 and the sixth lens 6 are defined by the following equation:

$$Z=Cy^2/[1+(1-\epsilon C^2y^2)^{1/2}]+Dy^4+Ey^6+Fy^8+Gy^{10}$$

where Z is the distance from the tangent surface of the apex of the aspherical surface to the point on the aspherical surface at height y from the optical axis X; y is the height from the optical axis X; C is the curvature (1/R) at the apex of the aspherical surface; $\epsilon$ is the conic constant; and D, E, F, G are aspherical surface coefficients.

In the first lens group I, the first lens 1 is a bi-convex lens with a positive refractive power and the second lens 2 is a bi-concave lens with a negative refractive power. The first lens group I satisfies the following:

$$v2-v1>20 \qquad (1)$$

where v1 is the Abbe number of the first lens 1 and v2 is the Abbe number of the second lens 2.

Equation 1 relates the Abbe numbers of the first lens 1 and the second lens 2. When Equation 1 is not satisfied, chromatic aberration along the axis and lateral chromatic aberration are difficult to correct. By satisfying Equation 1, chromatic aberration can be corrected over the entire range, and the resulting zoom lens is compact and provides superior optical properties.

In the second lens group (II), the third lens 3 satisfies the following:

$$R5>|R6| \qquad (2)$$

where R5 is the curvature radius on the object side and R6 is the curvature radius on the image plane side of the third lens 3. Various aberrations are further corrected when Equation 2 is satisfied.

Furthermore, the first lens group I and the third lens group III satisfy the following:

$$0.4<f2/|f1|<0.8 \qquad (3)$$

$$1.5<f3/fw<2.1 \qquad (4)$$

where f1, f2, and f3 are the focal lengths of the first lens group I, the second lens group II, and the third lens group III, and fw is the focal length of the overall lens system at the wide-angle end.

Equation 3 defines the appropriate ratio between the focal length of the first lens group I and the focal length of the second lens group II. When the ratio exceeds the upper limit, distortion and lateral chromatic aberration increase and are difficult to correct. When the ratio is below the lower limit, a zoom factor of approximately 2x is difficult to achieve. By satisfying Equation 3, the zoom lens is compact and provides superior optical properties, and a zoom factor of approximately 2x can be achieved.

Equation 4 defines the appropriate range for the focal length of the third lens group III. When the focal length of the third lens group III exceeds the upper limit, the exit pupil position approaches the image plane and telecentricity becomes difficult to obtain. When the focal length of the third lens group III is below the lower limit, the overall zoom lens is difficult to make compact. By satisfying equation 4, the zoom lens can be compact and can maintain telecentricity by setting an appropriate exit pupil position. Thus, a suitable zoom lens for high pixel count imaging elements can be provided.

TABLE 1

| | | | |
|---|---|---|---|
| Object Distance (mm) | Infinity (∞) | Thickness of Third Lens Group III (mm) | 2.25 |
| Focal Length (mm) | 5.97 8.70 11.37 | Total Lens Group Thickness (mm) | 10.90 |
| F Number | 2.93 3.54 4.22 | Back Focus (Air Conversion) (mm) | 3.327 3.527 3.327 |
| Exit Pupil Position (mm) | −25.5 −77.8 +112.1 | Field Angle (2 ω) | 60.3° 41.8° 32.1° |
| Total Lens Length (mm) | 28.941 26.561 27.366 | Focal Length f1 (mm) | −13.968 |
| Total Lens System Length (mm) | 31.737 30.088 30.693 | Focal Length f2 (mm) | 9.523 |
| Thickness of First Lens Group I (mm) | 2.70 | Focal Length f3 (mm) | 11.765 |
| Thickness of Second Lens Group II (mm) | 5.95 (includes lens stop) | Wide-Angle End Focal Length fw (mm) | 5.97 |

TABLE 2

| Surface | Curvature Radius (mm) | | Distance (mm) | | Refractive Indices (d line) | | Abbe Number | |
|---|---|---|---|---|---|---|---|---|
| S1 | R1 | 61.519 | D1 | 2.00 | n1 | 1.84666 | v1 | 23.8 |
| S2 | R2 | −31.975 | D2 | 0.70 | n2 | 1.74330 | v2 | 49.2 |
| S3 | R3 | 8.239 | | | | | | |
| | | | D3 | Variable | | | | |
| S4 | Aperture Stop | | | | | | | |
| | | | D4 | 0.60 | | | | |
| S5* | R5 | 45.508 | D5 | 1.50 | n3 | 1.60602 | v3 | 57.4 |
| S6* | R6 | −11.062 | | | | | | |
| | | | D6 | 0.20 | | | | |
| S7 | R7 | 5.360 | D7 | 2.65 | n4 | 1.83400 | v4 | 37.3 |
| S8 | R8 | −5.360 | D8 | 1.00 | n5 | 1.76182 | v5 | 26.6 |
| S9 | R9 | 3.277 | | | | | | |
| | | | D9 | Variable | | | | |
| S10* | R10 | 17.700 | D10 | 2.25 | n6 | 1.60602 | v6 | 57.4 |
| S11* | R11 | −11.366 | | | | | | |
| | | | D11 | Variable | | | | |
| S12 | R12 | ∞ | D12 | 1.70 | n7 | 1.51680 | v7 | 64.2 |
| S13 | R13 | ∞ | | | | | | |

*Aspherical Surface (BF 1.00)

TABLE 3

| Surface | Aspherical Surface Coefficient | Numerical Data |
|---|---|---|
| S5 | ε | −15.5488490 |
| | D | −0.3079220 × 10⁻³ |
| | E | 0.9371360 × 10⁻⁵ |
| | F | −0.1501740 × 10⁻⁵ |
| | G | 0.1042677 × 10⁻⁶ |
| S6 | ε | −2.7132520 |
| | D | −0.2450954 × 10⁻³ |
| | E | 0.9502070 × 10⁻⁵ |
| | F | 0.1691600 × 10⁻⁶ |
| | G | 0.1010990 × 10⁻⁶ |
| S10 | ε | 1.0497860 |
| | D | −0.6146290 × 10⁻³ |
| | E | 0.1083380 × 10⁻⁴ |
| | F | −0.3219610 × 10⁻⁶ |
| | G | −0.1082450 × 10⁻⁶ |
| S11 | ε | −0.5932890 |
| | D | −0.3973570 × 10⁻³ |
| | E | 0.1012890 × 10⁻⁴ |
| | F | −0.8081070 × 10⁻⁶ |
| | G | −0.5730080 × 10⁻⁷ |

TABLE 4

| | Wide-Angle End | Middle Position | Telephoto End |
|---|---|---|---|
| f (mm) | 5.97 (fw) | 8.7 (fm) | 11.37 (ft) |
| D3 (mm) | 13.617 | 8.688 | 6.544 |
| D9 (mm) | 4.424 | 6.973 | 9.921 |
| D11 (mm) | 1.206 | 1.406 | 1.206 |

Table 1 shows the main specification of the zoom lens according to an embodiment of the present invention as described above. Table 2 shows the numerical data for the individual lenses and the glass filter. Table 3 shows the numerical data for the aspherical surfaces of the lenses. Table 4 shows the numerical data for the focal length f and distances D3, D9, D11 along the optical axis X. fw, fm, ft are the focal lengths for the overall system at the wide-angle end, middle position, and telephoto end, respectively. In this embodiment, the numerical data for the zoom lens satisfies Equations 1, 2, 3, 4 so that $v2-v1=25.4$; $R5-|R6|=34.518$; $f2/|f1|=0.682$; and $f3/fw=1.971$.

FIGS. 2a–2d, 3a–3d, and 4a–4d are aberration line diagrams for spherical aberration, astigmatism, distortion (%), and lateral chromatic aberration at the wide-angle end, the middle position, and the telephoto end. In FIGS. 2a–2d, 3a–3d, and 4a–4d, d is the aberration at line d, F is the aberration at line F, c is the aberration at line c, SC indicates offense against the sine condition, DS is the sagittal plane aberration, and DT represents meridional plane aberration.

At the wide-angle end, middle position, and telephoto end of this embodiment of the zoom lens, the total length of the zoom lens from the front surface S1 of the first lens 1 to the rear surface S11 of the sixth lens 6 is 28.941 mm, 26.561 mm, and 27.366 mm; the total length of the lens system from the front surface S1 of the first lens 1 to the image plane, including the cover glass of the CCD, is 31.737 mm, 30.088 mm, and 30.693 mm; the back focus (air conversion) is 3.327 mm, 3.527 mm, and 3.327 mm; the exit pupil position is −25.5 mm, −77.8 mm, and +112.1 mm; and the F number is 2.93, 3.54, and 4.22.

When the zoom magnification is 1.9, the total length during imaging is 32.847 mm, the length along the optical axis is 10.9 mm, the back focus is 3.327 mm, the exit pupil position is −25.322 mm, and TV distortion is −1.32%.

A zoom lens having this structure is compact since it has a small total length and provides superior optical properties. Furthermore, this zoom lens can effectively correct various aberrations and is suitable for high-density, high pixel count imaging elements.

Figure 5:
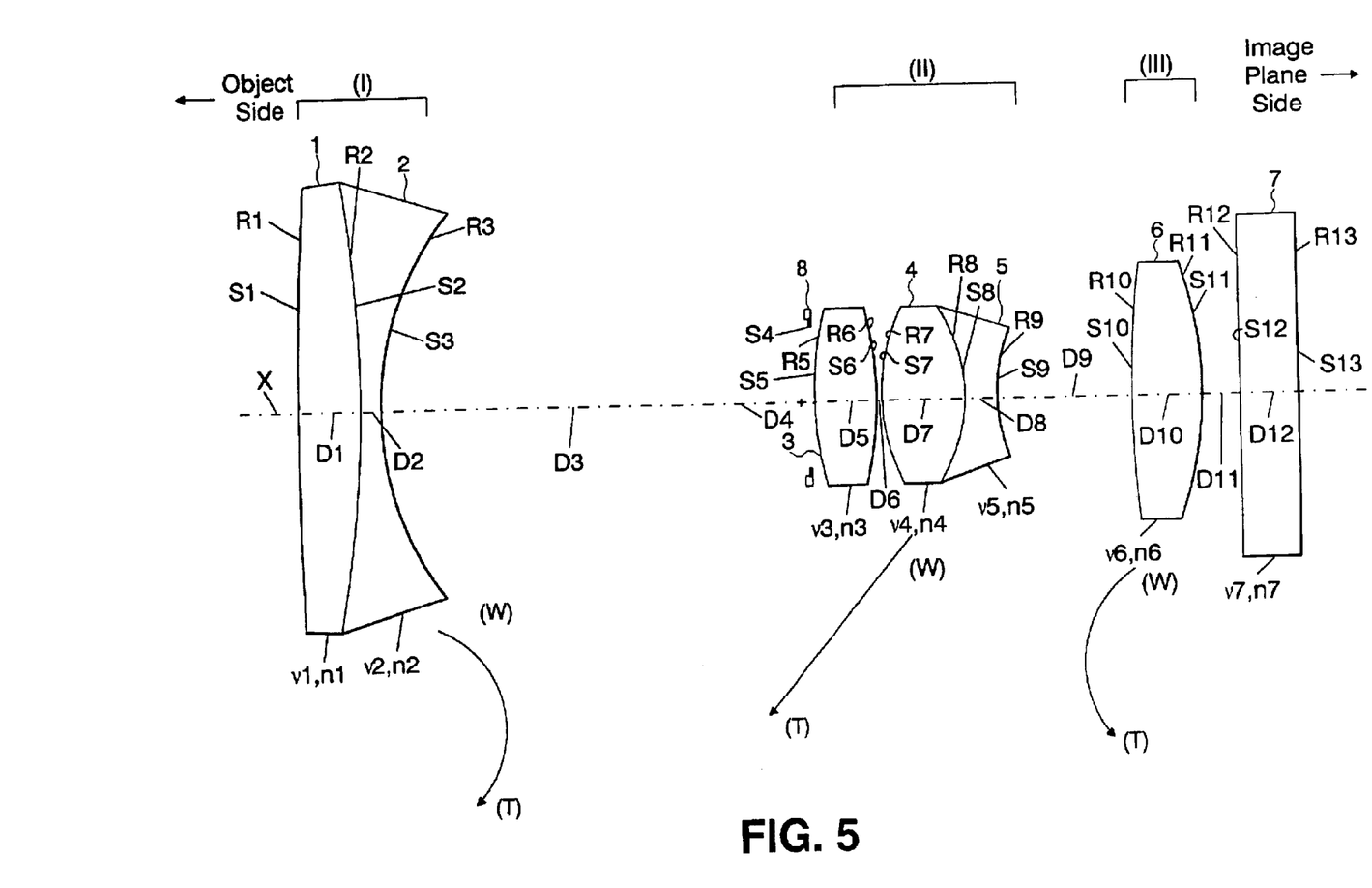
FIG. 5 shows the structure of a zoom lens according to an embodiment of the present invention.
Figure 6A:
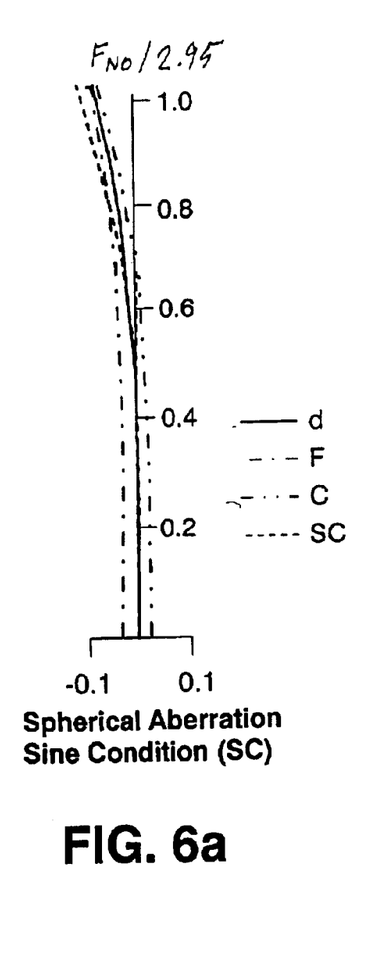
FIG. 6a shows spherical aberration sine condition of the zoom lens of FIG. 5 at a wide-angle end.
Figure 6B:
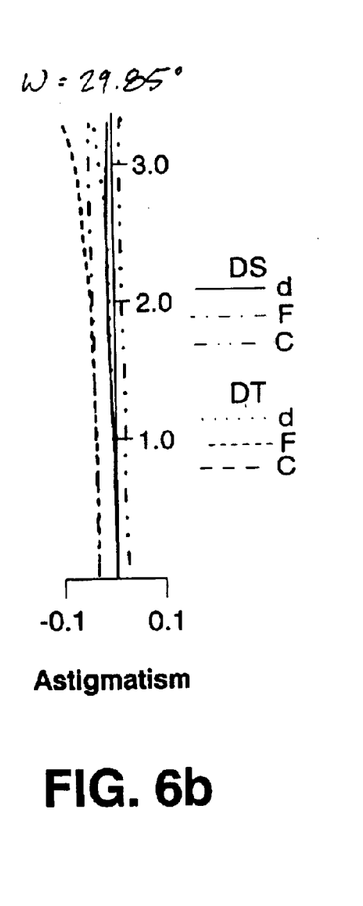
FIG. 6b shows astigmatism of the zoom lens of FIG. 5 at a wide-angle end.
Figure 6C:
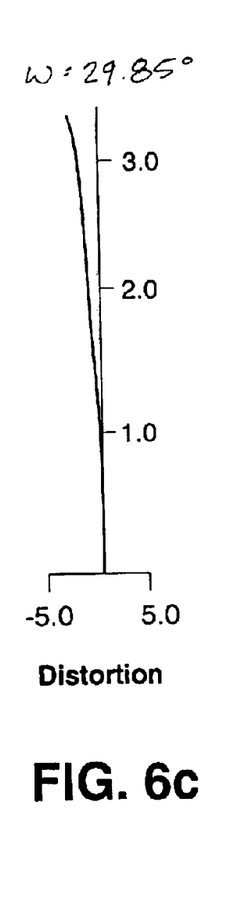
FIG. 6c shows distortion of the zoom lens of FIG. 5 at a wide-angle end.
Figure 6D:
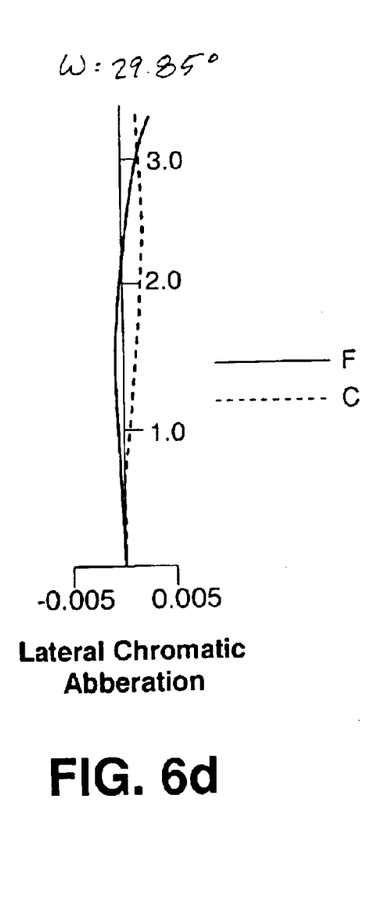
FIG. 6d shows lateral chromatic aberration of the zoom lens of FIG. 5 at a wide-angle end.
Figure 7A:
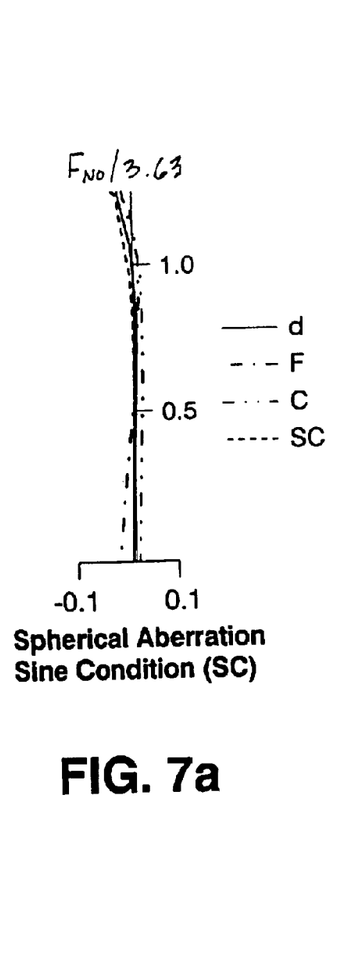
FIG. 7a shows spherical aberration sine condition of the zoom lens of FIG. 5 at a middle position.
Figure 7B:
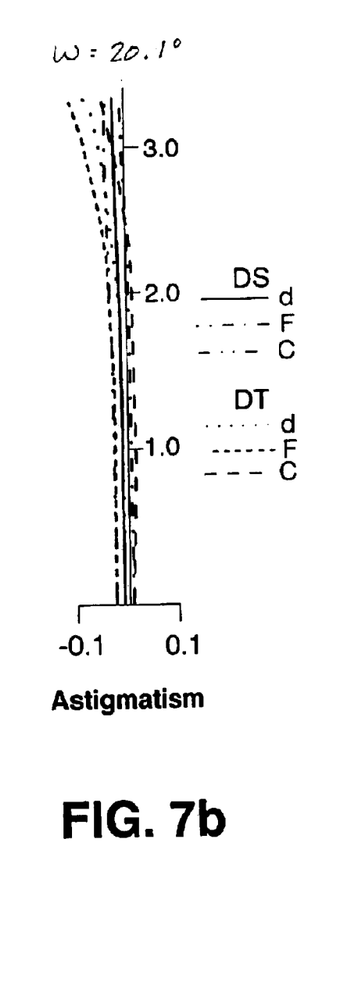
FIG. 7b shows astigmatism of the zoom lens of FIG. 5 at a middle position.
Figures 7C, 7D:
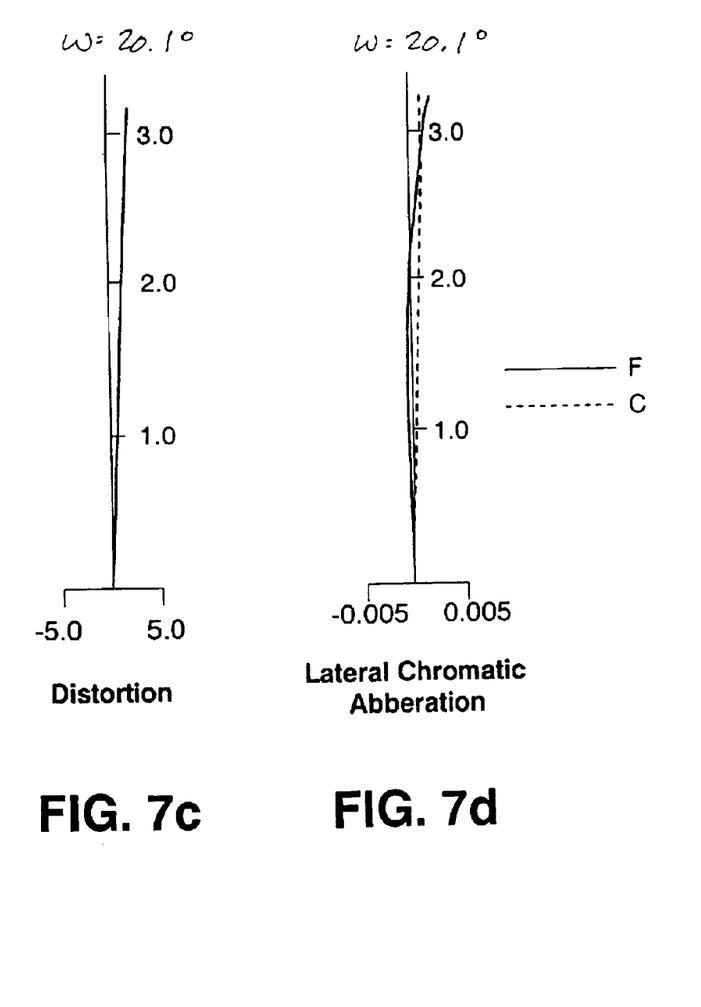
FIG. 7c shows distortion of the zoom lens of FIG. 5 at a middle position.
FIG. 7d shows lateral chromatic aberration of the zoom lens of FIG. 5 at a middle position.
Figure 8A:
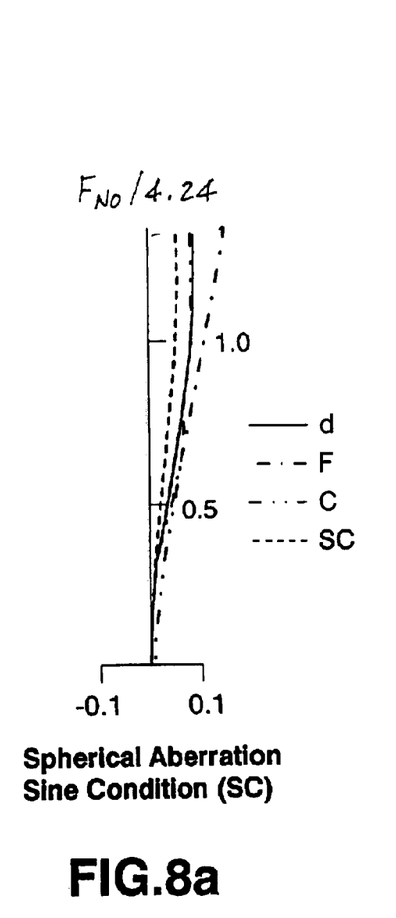
FIG. 8a shows spherical aberration sine condition of the zoom lens of FIG. 5 at a telephoto end.
Figure 8B:
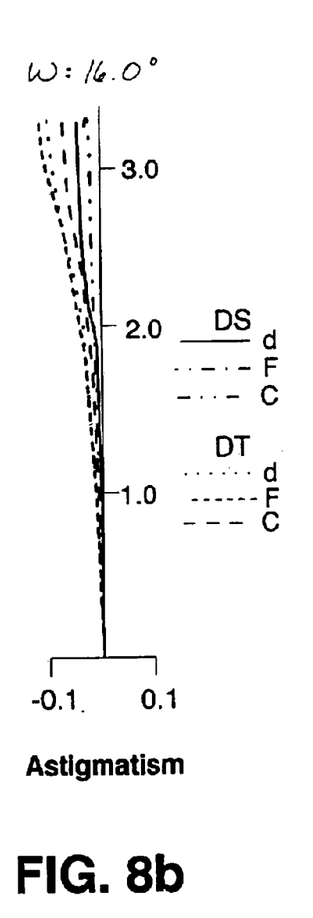
FIG. 8b shows astigmatism of the zoom lens of FIG. 5 at a telephoto end.
Figure 8C:
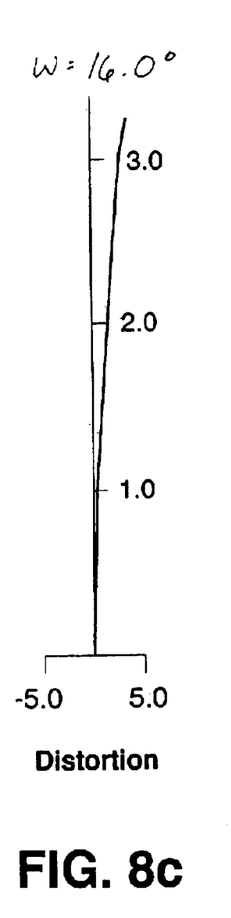
FIG. 8c shows distortion of the zoom lens of FIG. 5 at a telephoto end.
Figure 8D:
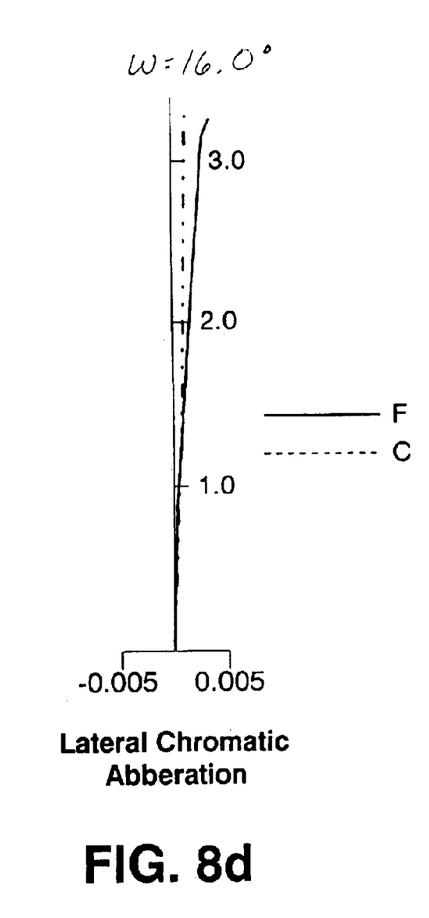
FIG. 8d shows lateral chromatic aberration of the zoom lens of FIG. 5 at a telephoto end.

FIG. 5 shows the basic structure of another embodiment of a zoom lens according to the present invention. Except for changes in the lens specification, this zoom lens has a structure similar to that of the embodiment described above.

TABLE 5

| | | | |
|---|---|---|---|
| Object Distance (mm) | Infinity (∞) | Thickness of Third Lens Group III (mm) | 2.25 |
| Focal Length (mm) | 5.97 8.90 11.25 | Total Lens Group Thickness (mm) | 11.30 |
| F Number | 2.95 3.63 4.24 | Back Focus (Air Conversion) (mm) | 3.396 3.596 3.396 |
| Exit Pupil Position (mm) | −26.4 −98.4 +115.3 | Field Angle (2 ω) | 59.7° 40.2° 32.0° |

TABLE 5-continued

| | | | |
|---|---|---|---|
| Total Lens Length (mm) | 29.451 26.958 27.677 | Focal Length f1 (mm) | −13.966 |
| Total Lens System Length (mm) | 32.847 30.544 31.073 | Focal Length f2 (mm) | 9.524 |
| Thickness of First Lens Group I (mm) | 2.90 | Focal Length f3 (mm) | 11.765 |
| Thickness of Second Lens Group II (mm) | 6.15 (includes lens stop) | Wide-Angle End Focal Length fw (mm) | 5.97 |

TABLE 6

| Surface | Curvature Radius (mm) | | Distance (mm) | | Refractive Indices (d line) | | Abbe Number |
|---|---|---|---|---|---|---|---|
| S1 | R1 | 60.066 | D1 | 2.20 | n1 | 1.84666 | v1 23.8 |
| S2 | R2 | −34.975 | D2 | 0.70 | n2 | 1.74330 | v2 49.2 |
| S3 | R3 | 8.191 | | | | | |
| | | | D3 | Variable | | | |
| S4 | Aperture Stop | | | | | | |
| | | | D4 | 0.60 | | | |
| S5* | R5 | 17.874 | D5 | 1.70 | n3 | 1.60602 | v3 57.4 |
| S6* | R6 | −13.857 | | | | | |
| | | | D6 | 0.20 | | | |
| S7 | R7 | 5.843 | D7 | 2.65 | n4 | 1.83400 | v4 37.3 |
| S8 | R8 | −5.843 | D8 | 1.00 | n5 | 1.76182 | v5 26.6 |
| S9 | R9 | 3.453 | | | | | |
| | | | D9 | Variable | | | |
| S10* | R10 | 25.251 | D10 | 2.25 | n6 | 1.60602 | v6 57.4 |
| S11* | R11 | −9.601 | | | | | |
| | | | D11 | Variable | | | |
| S12 | R12 | ∞ | D12 | 1.70 | n7 | 1.51680 | v7 64.2 |
| S13 | R13 | ∞ | | | | | |

*Aspherical Surface (BF 1.00)

TABLE 7

| Surface | Aspherical Surface Coefficient | Numerical Data |
|---|---|---|
| S5 | ε | −2.0490000 |
| | D | −0.1380355 × 10⁻³ |
| | E | 0.8368320 × 10⁻⁵ |
| | F | −0.4718200 × 10⁻⁶ |
| | G | 0.9426580 × 10⁻⁷ |
| S6 | ε | −3.0137680 |
| | D | −0.2500340 × 10⁻⁴ |
| | E | 0.3504880 × 10⁻⁵ |
| | F | 0.1692330 × 10⁻⁶ |
| | G | 0.1011000 × 10⁻⁶ |
| S10 | ε | 2.0498800 |
| | D | −0.6146540 × 10⁻³ |
| | E | 0.1081910 × 10⁻⁴ |
| | F | −0.3229990 × 10⁻⁶ |
| | G | −0.1081810 × 10⁻⁶ |
| S11 | ε | −1.5929480 |
| | D | −0.3574130 × 10⁻³ |
| | E | 0.1215600 × 10⁻⁴ |
| | F | −0.8001200 × 10⁻⁶ |
| | G | −0.6067790 × 10⁻⁷ |

TABLE 8

| | Wide-Angle End | Middle Position | Telephoto End |
|---|---|---|---|
| f (mm) | 5.97 (fw) | 8.9 (fm) | 11.25 (ft) |
| D3 (mm) | 13.838 | 8.614 | 6.752 |
| D9 (mm) | 4.313 | 7.044 | 9.625 |
| D11 (mm) | 1.275 | 1.475 | 1.275 |

Table 5 shows the main specification of the zoom lens according to this embodiment of the present invention. Table 6 shows the numerical data for the individual lenses and the glass filter. Table 7 shows the numerical data for the aspherical surfaces of the lenses. Table 8 shows the numerical data for the focal length f and distances D3, D9, D11 along the optical axis X. fw, fm, ft are the focal lengths for the overall system at the wide-angle end, middle position, and telephoto end, respectively. In this embodiment, the numerical data for the zoom lens satisfies Equations 1, 2, 3, 4 so that $v_2 - v_1 = 25.4$; $R_5 - |R_6| = 4.017$; $f_2/|f_1| = 0.682$; and $f_3/fw = 1.971$.

FIGS. 6a–6d, 7a–7d, and 8a–8d are aberration line diagrams for spherical aberration, astigmatism, distortion (%), and lateral chromatic aberration at the wide-angle end, the middle position, and the telephoto end. In FIGS. 6a–6d, 7a–7d, and 8a–8d, d is the aberration at line d, F is the aberration at line F, c is the aberration at line c, SC indicates offense against the sine condition, DS is the sagittal plane aberration, and DT represents meridional plane aberration.

At the wide-angle end, middle position, and telephoto end of this embodiment of the zoom lens, the total length of the zoom lens from the front surface S1 of the first lens 1 to the rear surface S11 of the sixth lens 6 is 29.451 mm, 26.958 mm, and 27.677 mm; the total length of the lens system from the front surface SI of the first lens 1 to the image plane, including the cover glass of the CCD, is 32.847 mm, 30.544 mm, and 31.073 mm; the back focus (air conversion) is 3.396 mm, 3.596 mm, and 3.396 mm; the exit pupil position is −26.4 mm, −98.4 mm, and +115.3mm; and the F number is 2.95, 3.63, and 4.24.

When the zoom magnification is 1.88, the total length during imaging is 33.426 mm, the length along the optical axis is 11.3 mm, the back focus is 3.396 mm, the exit pupil position is −26.437 mm, and TV distortion is −0.91%.

A zoom lens having this structure is compact since it has a small total length and provides superior optical properties. Furthermore, this zoom lens can effectively correct various aberrations and is suitable for high-density, high pixel count imaging elements.

A zoom lens according to the present invention is compact, thin, light-weight, and inexpensive to produce. Furthermore, the zoom lens effectively corrects various types of aberrations.

More specifically, the present invention provides a suitable zoom lens for high pixel count imaging elements. This zoom lens has a compact, thin design, superior optical properties, a zoom magnification of approximately 2×, an overall lens length during imaging of no more than 34 mm that allows a compact design, a total axial length of the lens groups of no more than 12 mm that allows a compact and thin design in a retracted state, a back focus of at least 3 mm that allows the use of a low-pass filter or the like, a lens brightness (F number) at the wide-angle end of approximately 2.8, and distortion (TV distortion) of no more than |1.5%|.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended

What is claimed is:

1. A zoom lens comprising, from an object side to an image plane side:
   a first lens group having negative overall refractive power,
      a second lens group having positive overall refractive power, and a third lens group having positive overall refractive power, wherein:

said first lens group comprises a first lens and a second lens bonded together and having a negative refractive power;

said second lens group comprises a third lens with a positive refractive power, and a fourth lens and a fifth lens bonded together and having a negative refractive power; and said third lens group comprises a sixth lens having a positive refractive power, wherein said third lens satisfies:

(1) $R5 > |R6|$ where R5 is an object-side curvature radius of said third lens and R6 is an image-plane-side curvature radius of said third lens.

2. A zoom lens according to claim 1, wherein:

said first lens is a bi-convex lens located toward said object side and has a positive refractive power;

said second lens is a bi-concave lens located toward said image plane side and has a negative refractive power; and (2) $v2 - v1 > 20$ where v1 is an Abbe number of said first lens and v2 is an Abbe number of said second lens.

3. A zoom lens comprising, from an object side to an image plane side:

a first lens group having negative overall refractive power, a second lens group having positive overall refractive power, and a third lens group having positive overall refractive power, wherein:

said first lens group comprises a first lens and a second lens bonded together and having a negative refractive power:

said second lens group comprises a third lens with a positive refractive power, and a fourth lens and a fifth lens bonded together and having a negative refractive power; and said third lens group comprises a sixth lens having a positive refractive power, wherein:

(3) $0.4 < f2/|f1| < 0.8$ (4) $1.5 < f3/fw < 2.1$ where f1 is a focal length of said first lens group, f2 is a focal length of said second lens group, f3 is a focal length of said third lens group, and fw is a focal length at a wide-angle end of a total lens system comprising said first lens group, said second lens group, and said third lens group.

4. A zoom lens according to claim 3 wherein said third lens is a bi-convex lens with both surfaces comprising aspherical surfaces.

5. A zoom lens according to claim 4, wherein said third lens satisfies:

(2) $R5 > 1|R6|$ where R5 is an object-side curvature radius of said third lens and R6 is an image-plane-side curvature radius of said third lens.

6. A zoom lens according to claim 3, wherein:

said fourth lens is a bi-convex lens with a positive refractive power and is located on said object side; and said fifth lens is a bi-concave lens with a negative refractive power and is located on said image plane side.

7. A zoom lens according to claim 3 wherein said sixth lens is a bi-convex lens with both sides comprising aspherical surfaces.

8. A zoom lens comprising, from an object side to an image plane side:

a first lens group having negative overall refractive power, a second lens group having positive overall refractive power, and a third lens group having positive overall refractive power, wherein:

said first lens group comprises a first lens and a second lens bonded together and having a negative refractive power;

said second lens group comprises a third lens with a positive refractive power, and a fourth lens and a fifth lens bonded to together and having a negative refractive power; and said third lens group comprises a sixth lens having a positive refractive power, wherein said third lens group is first moveable toward said object side along said optical axis and is then moveable toward said image plane side in a zoom operation from said wide-angle end to said telephoto end.

9. A zoom lens according to claim 8, wherein said first lens group, said second lens group, and said third lens group each are moveable along an optical axis in a zoom operation from a wide-angle end to a telephoto end.

* * * * *